US009747434B1

(12) United States Patent
Avital

(10) Patent No.: US 9,747,434 B1
(45) Date of Patent: Aug. 29, 2017

(54) AUTHENTICATING WITH AN EXTERNAL DEVICE BY PROVIDING A MESSAGE HAVING MESSAGE FIELDS ARRANGED IN A PARTICULAR MESSAGE FIELD ORDER

(71) Applicant: EMC Corporation, Hopkinton, MA (US)

(72) Inventor: Aviv Avital, Be'er Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 13 days.

(21) Appl. No.: 14/856,952

(22) Filed: Sep. 17, 2015

(51) Int. Cl.

| H04L 9/32 | (2006.01) |
|---|---|
| H04L 29/06 | (2006.01) |
| G06F 21/00 | (2013.01) |
| G06F 7/04 | (2006.01) |
| G06F 21/44 | (2013.01) |
| H04L 29/08 | (2006.01) |
| H04W 12/06 | (2009.01) |

(52) U.S. Cl.
CPC .............. *G06F 21/44* (2013.01); *H04L 63/08* (2013.01); *H04L 67/02* (2013.01); *H04W 12/06* (2013.01)

(58) Field of Classification Search
CPC ........ G06F 21/44; H04W 12/06; H04L 63/08; H04L 67/02
USPC ........................... 726/7, 4; 713/161, 168, 182
See application file for complete search history.

(56) References Cited

U.S. PATENT DOCUMENTS

| 8,627,479 | B2 | 1/2014 | Wittenstein et al. | |
|---|---|---|---|---|
| 8,631,475 | B1 | 1/2014 | O'Malley et al. | |
| 8,756,684 | B2 | 6/2014 | Frantz et al. | |
| 9,021,583 | B2 | 4/2015 | Wittenstein et al. | |
| 9,164,820 | B1* | 10/2015 | McAleer | G06F 11/26 |
| 2004/0117801 | A1* | 6/2004 | Eibach | G06F 9/546 |
| | | | | 719/314 |
| 2005/0254514 | A1* | 11/2005 | Lynn | G06F 21/00 |
| | | | | 370/450 |
| 2010/0223342 | A1* | 9/2010 | Brown | H04L 12/58 |
| | | | | 709/206 |
| 2011/0080937 | A1* | 4/2011 | Kim | H04L 5/0007 |
| | | | | 375/219 |
| 2011/0209202 | A1* | 8/2011 | Otranen | H04L 63/08 |
| | | | | 726/4 |
| 2012/0300778 | A1* | 11/2012 | Tamura | H04L 12/66 |
| | | | | 370/392 |

(Continued)

*Primary Examiner* — Aravind Moorthy
(74) *Attorney, Agent, or Firm* — BainwoodHuang

(57) ABSTRACT

A technique performs authentication with an external device. The technique involves receiving, by electronic circuitry, a messaging command. The technique further involves providing, by the electronic circuitry, a message to the external device in response to the messaging command. The message includes message fields which store message operating parameters e.g., Hypertext Transfer Protocol (HTTP) header fields containing HTTP operating parameters to form part of an HTTP transaction. The message fields of the message are arranged in a particular order to match an expected order during an order comparison operation performed by the external device to gauge authenticity of the message source. If the particular order matches the expected order, there is lower risk that the message source is fraudulent. However, if the particular order does not match the expected order, there is higher risk that the message source is fraudulent.

18 Claims, 7 Drawing Sheets

(56) References Cited

U.S. PATENT DOCUMENTS

| | | | |
|---|---|---|---|
| 2013/0326224 A1* | 12/2013 | Yavuz | H04L 9/3247 |
| | | | 713/176 |
| 2014/0181193 A1* | 6/2014 | Narasimhan | H04L 67/306 |
| | | | 709/204 |
| 2016/0065550 A1* | 3/2016 | Kanov | H04L 63/08 |
| | | | 726/7 |

* cited by examiner

AUTHENTICATING WITH AN EXTERNAL DEVICE BY PROVIDING A MESSAGE HAVING MESSAGE FIELDS ARRANGED IN A PARTICULAR MESSAGE FIELD ORDER

BACKGROUND

A conventional approach to authenticating a human involves receiving a current one-time passcode (OTP) from a computer operated by the human, and comparing the current OTP to an expected OTP for that human. If the current OTP matches the expected OTP, authentication of the human is considered successful. However, if the current OTP does not match the expected OTP, authentication of the human is considered unsuccessful.

Once authentication is deemed successful under the conventional approach, the human is allowed to access one or more protected resources. Such protected resources may include account access (e.g., logins, virtual private network access, etc.), access to sensitive data (e.g., files, confidential records, software, etc.), and the ability to complete transactions (e.g., online purchases, financial transactions, etc.).

SUMMARY

Unfortunately, there are deficiencies to the above described conventional approach to authenticating a human by comparing a current OTP to an expected OTP. Along these lines, it may be burdensome for a human to read a current OTP (e.g., from a hardware token) and manually enter the current OTP (e.g., into a computer) to authenticate. If the human misreads or mistypes the current OTP, authentication will be unsuccessful and the human will be denied access. Moreover, if the human is error prone and fails to authenticate several times in a row within a short time period, the human may even be locked out and prevented from further attempting to authenticate.

Additionally, once the human successfully authenticates, access to the protected resource (e.g., access to an account, access to sensitive data, and the ability to complete transactions) typically remains during the entire access session so that a malicious person could take over access to the protected resource. For example, a logged in session to an account could be copied (or cloned) by a malicious person on another device, thus enabling the malicious person to gain access the account from the other device. Furthermore, if the human inadvertently navigates to a malicious device (e.g., a phishing website or server) rather than the correct one and provides a current OTP attempting to login, the malicious device now has the ability to login on behalf of the human and thus access the protected resource.

In contrast to the above-described conventional approach to authenticating which simply compares a current OTP to an expected OTP, improved techniques are directed to authenticating with an external device by providing a message having message fields arranged in a particular message field order, e.g., Hypertext Transfer Protocol (HTTP) header fields containing HTTP operating parameters. If the particular message field order matches an expected message field order, there is lower risk that the source of the message is fraudulent (i.e., the source of the message properly ordered the message fields). However, if the particular message field order does not match the expected message field order, there is higher risk that the source of the message is fraudulent (i.e., the source of the message did not properly order the message fields). Such ordering of message fields can occur automatically and transparently (e.g., by an agent of the source device) thus providing a simpler authentication mechanism vis-à-vis manually reading and entering OTPs or other credentials. Additionally, authentication based on message field order can be imposed bi-directionally to protect against involvement of an unauthorized device (e.g., cloning, phishing, etc.). Furthermore, such techniques can be combined with other types of authentication such as risk-based authentication (based on a numerical measure of risk), adaptive authentication (based on a comparison of current behavior to previous behavior), biometric authentication, multi-factor authentication, authentication using OTPs, and so on.

One embodiment is directed to a method which is performed in a user device. The method performs authentication with an external device such as an authentication server. The method includes receiving, by electronic circuitry of the user device, a messaging command. The method further includes providing, by the electronic circuitry, a message to the external device in response to the messaging command. The message includes message fields which store message operating parameters. The message fields of the message are arranged in a particular message field order to match an expected message field order during a message field order comparison operation performed by the external device to gauge authenticity of the user device.

In some arrangements, providing the message includes forming (or customizing) a header section of the message. In these arrangements, the header section includes, as the message fields arranged in the particular message field order, a current sequence of header fields in compliance with a standard protocol (e.g., HTTP header fields containing operating parameters for an HTTP transaction where the header fields are arranged in a particular header field sequence from a multitude of possible header field sequences).

In some arrangements, the method further includes receiving, from the external device, a response to the message. In these arrangements, the response includes response fields which store response operating parameters. The response fields of the response are arranged in a particular response field order. Here, the method further includes comparing the particular response field order to an expected response field order to determine authenticity of the external device (i.e., bi-directional authentication).

Another embodiment is directed to an electronic apparatus which includes a communications interface, memory, and processing circuitry coupled to the communications interface and the memory. The memory stores instructions which, when carried out by the processing circuitry, cause the processing circuitry to receive a messaging command, and provide a message to the external device through the communications interface in response to the messaging command. The message includes message fields which store message operating parameters. The message fields of the message are arranged in a particular message field order to match an expected message field order during a message field order comparison operation performed by the external device to gauge authenticity of the user device.

Yet another embodiment is directed to a computer program product having a non-transitory computer readable medium which stores a set of instructions to perform authentication with an external device. The set of instructions, when carried out by computerized circuitry, causes the computerized circuitry to perform a method of receiving a messaging command, and providing a message to the external device in response to the messaging command. The message includes message fields which store message operating parameters. The message fields of the message are arranged in a particular message field order to match an expected message field order during a message field order comparison operation performed by the external device to gauge authenticity of the user device.

Another embodiment is directed to a method which is performed in an authentication server. The method performs authentication with an external device. In particular, the method includes receiving, by electronic circuitry of the authentication server, a message from an external device. The message includes message fields which store message operating parameters (e.g., HTTP header fields storing operating parameters for an HTTP transaction). The message fields of the message are arranged in a particular message field order. The method further includes performing, by the electronic circuitry, a message field order comparison operation to compare the particular message field order to an expected message field order to gauge authenticity of the external device. The method further includes processing, by the electronic circuitry, the message based on a result of the message field order comparison operation.

Another embodiment is directed to an electronic apparatus which includes a communications interface, memory, and processing circuitry coupled to the communications interface and the memory. The memory stores instructions which, when carried out by the processing circuitry, cause the processing circuitry to:

(A) receive a message from an external device through the communications interface, the message including message fields which store message operating parameters, the message fields of the message being arranged in a particular message field order;

(B) perform a message field order comparison operation to compare the particular message field order to an expected message field order to gauge authenticity of the external device; and (C) process the message based on a result of the message field order comparison operation.

Another embodiment is directed to a computer program product having a non-transitory computer readable medium which stores a set of instructions to perform authentication with an external device. The set of instructions, when carried out by computerized circuitry, causes the computerized circuitry to perform a method of:

(A) receiving a message from an external device, the message including message fields which store message operating parameters, the message fields of the message being arranged in a particular message field order;

(B) performing a message field order comparison operation to compare the particular message field order to an expected message field order to gauge authenticity of the external device; and (C) processing the message based on a result of the message field order comparison operation.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in authenticating with an external device by providing a message having message fields arranged in a particular message field order.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to authenticating with an external device by providing a message having message fields arranged in a particular message field order, e.g., Hypertext Transfer Protocol (HTTP) header fields containing HTTP operating parameters. If the particular message field order matches an expected message field order, there is lower risk that the source of the message is fraudulent. However, if the particular message field order does not match the expected message field order, there is higher risk that the source of the message is fraudulent. Such ordering and verification of message fields can occur automatically and transparently thus alleviating the need to require any human to manually read and enter passwords, personal identifiers, one-time passcodes (OTPs), etc. Additionally, authentication based on message field order can be imposed in each direction to protect against involvement of an unauthorized device. Furthermore, such techniques can be combined with other types of authentication such as risk-based or adaptive authentication, biometric authentication, multi-factor authentication, authentication using OTPs, and so on.

Figure 1:
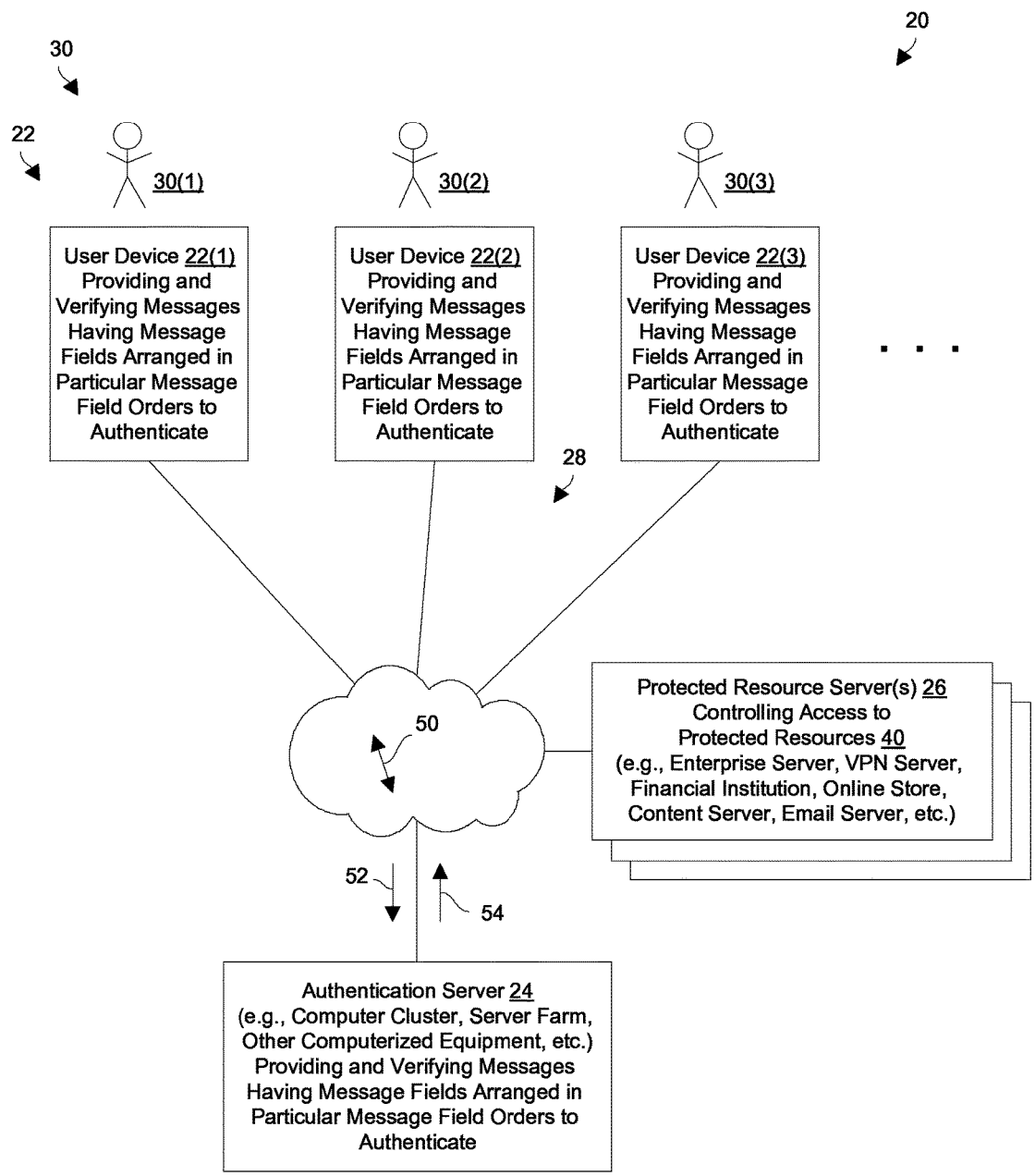
FIG. 1 is a block diagram of an electronic environment which performs authentication by providing a message having message fields arranged in a particular message field order.

FIG. 1 is a block diagram of an electronic environment 20 which performs authentication based on messages having message fields arranged in particular message field orders. The electronic environment 20 includes user devices 22(1), 22(2), 22(3), . . . (collectively, user devices 22), an authentication server 24, protected resource servers 26, and a communications medium 28.

Each user device 22 is constructed and arranged to perform useful work on behalf of a respective user 30. Along these lines, a user 30(1) possesses and operates user device 22(1), a user 30(2) possesses and operates user device 22(2), a user 30(3) possesses and operates user device 22(3), and so on. Examples of suitable user devices 22 include workstations, desktop computers, laptops, tablet devices, smart phones, and the like.

The authentication server 24 is constructed and arranged to communicate with the user devices 22 to perform authentication. Examples of suitable authentication servers 24 include clusters of computers, server farms, and other types of computerized equipment. Examples of suitable types of authentication include risk-based authentication, adaptive authentication, biometric authentication, multifactor authentication, and various other standard forms of authentication. As will be explained in further detail below, such forms of authentication are enhanced because the orders of the message fields of messages exchanged between the user devices 22 and the authentication server 24 are evaluated to determine authenticity.

The protected resource servers 26 are constructed and arranged to control access to protected resources 40. Such protected resources 40 are capable of being accessed remotely by the user devices 22 following successful authentication with the authentication server 24. Examples of suitable remote protected resources 40 include (among others) accounts and databases of enterprises, VPNs/gateways/other networks, account access and transaction access with banks/brokerages/other financial institutions, transaction capabilities at online stores, databases containing movies/music/files/other content, access to email, access to applications and online games, and so on.

The communications medium 28 is constructed and arranged to connect the various components of the electronic environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, WAN-based communications, distributed infrastructure communications, other topologies, combinations thereof, etc.

During operation, the user devices 22 go through a pre-configuration (or initial enrollment) process in which each user device 22 and the authentication server 24 are set up to identify a particular message field order for a particular user 30, e.g., based on a mathematical calculation, a user identifier (ID), current time, and/or other factors. Such a pre-configuration process involves assigning each user a user ID which uniquely identifies that user 30 among other users 30, and provisioning each user device 22 with specialized code and unique user credentials to algorithmically derive message field orders among multiple possible message field orders in synchrony with the authentication server 24.

Once pre-configuration/enrollment is complete, each user device 22 is equipped to output a message 52 having a particular message field order to the authentication server 24, and the authentication server 24 is able to verify that the message 52 has the particular message field order to confirm authenticity of the message 52 from that user device 22. Similarly, the authentication server 24 is equipped to output a message 54 having a particular message field order to each user device 22, and that user device 22 is able to verify that the message 54 has the particular message field order to confirm authenticity of the message 54 from the authentication server 24. It should be understood that, within a series of messages 52, 54 exchanged back and forth between a user device 22 and the authentication server 24 (e.g., an HTTP transaction), each message 52, 54 may have a different message field order.

Accordingly, each user device 22 now authenticates with the authentication server 24, and the authentication server 24 authenticates with each user device 22 (i.e., bi-directional authentication). In particular, each user device 22 customizes (e.g., modifies) the particular order of message fields in each message 52 sent from that user device 22 to the authentication server 24. The authentication server 24 compares the particular order of message fields in each message 52 to an expected order of message fields to determine whether that user device 22 is authentic or fraudulent.

Likewise, the authentication server 24 customizes the particular order of message fields in each message 54 sent from authentication server 24 to each user device 22. Upon receipt of such a message 54, the user device 22 compares the particular order of message fields to an expected order of message fields to determine whether the authentication server 24 is authentic or fraudulent.

With such bi-directional authentication taking place over the course of perhaps a series of messages 52, 54 back and forth (e.g., an HTTP transaction), an attempt to copy or clone a session by a malicious device would be detected and blocked due to unsuccessful authentication (e.g., when the field orders do not match). Additionally, such bi-directional authentication activity can be performed automatically by the electronic circuitry in the user devices 22 and the authentication server 24 thus alleviating manual burden of reading and typing OTPs from the users 30. Nevertheless, in some arrangements, such field order matching strengthens OTP authentication. Further details will now be provided with reference to FIGS. 2 and 3.

Figure 2:
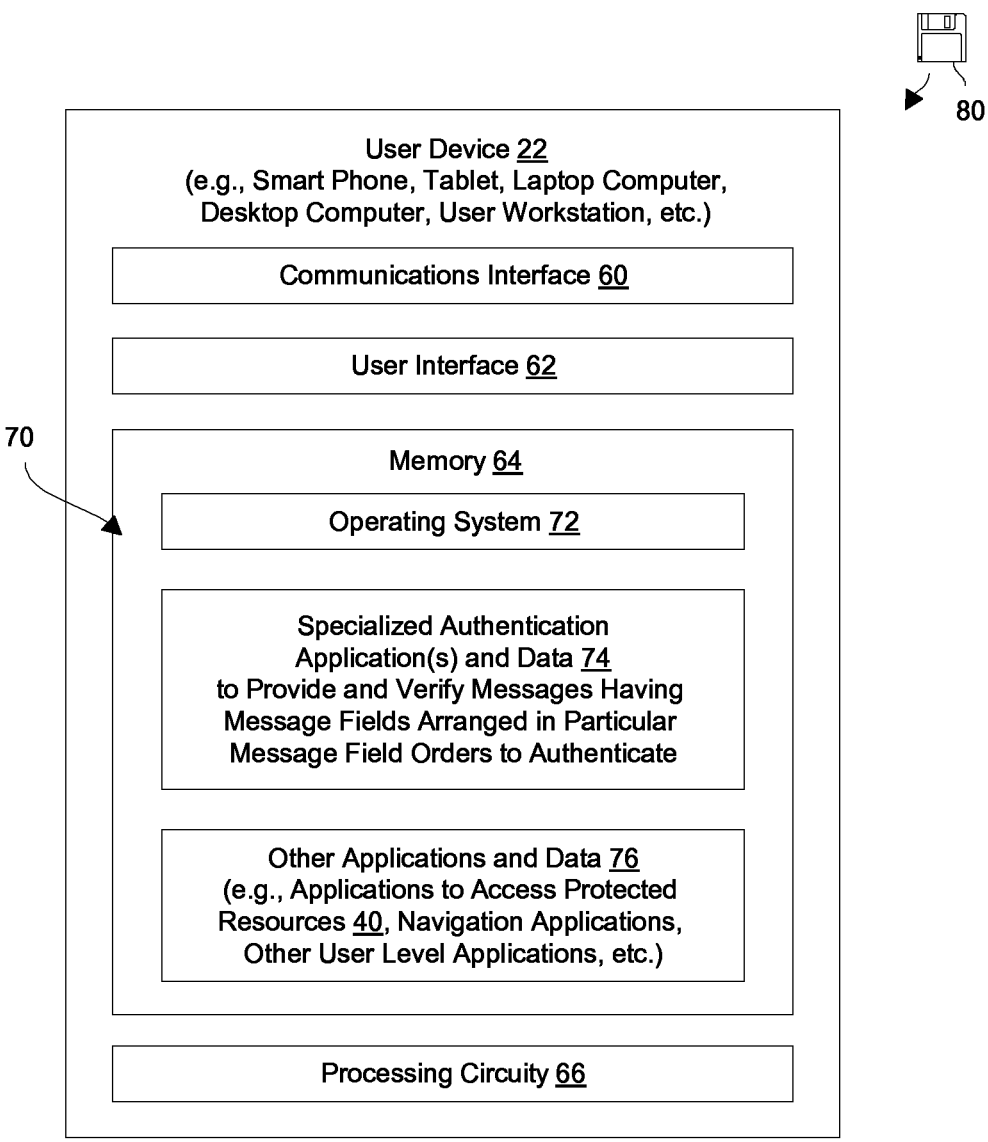
FIG. 2 is a block diagram of a user device of the electronic environment of FIG. 1.
Figure 3:
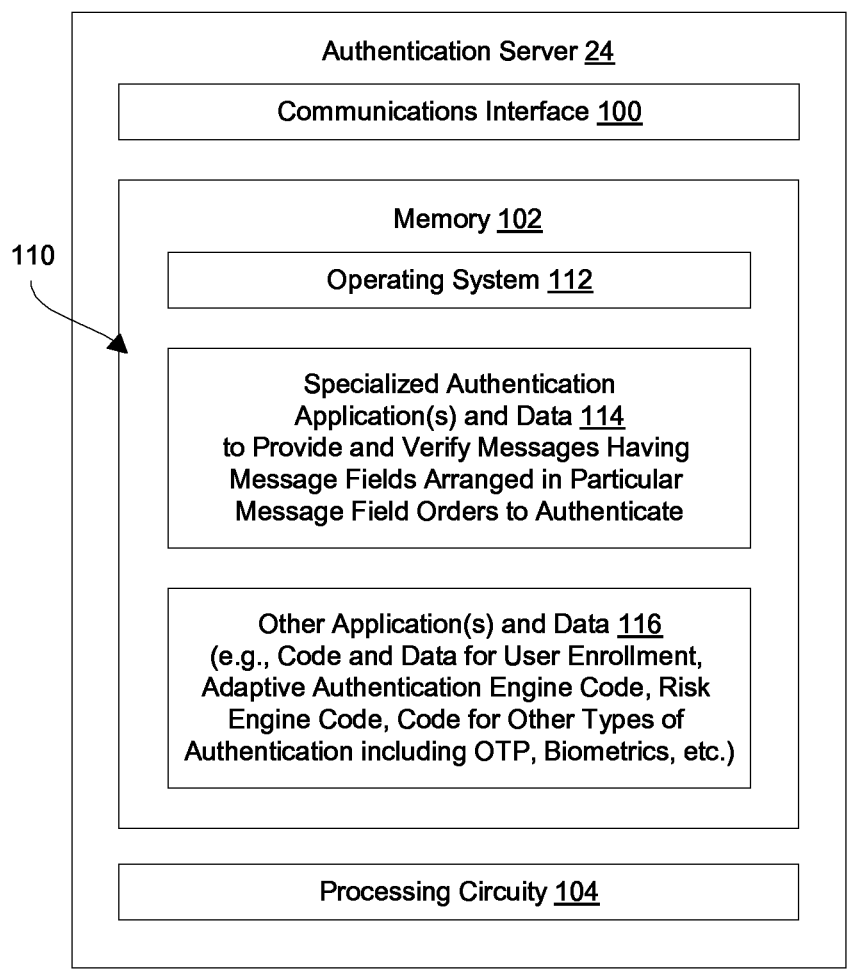
FIG. 3 is a block diagram of an authentication server of the electronic environment of FIG. 1.

FIGS. 2 and 3 show particular apparatus details of components within the electronic environment 20 of FIG. 1. FIG. 2 is a block diagram of a user device 22 of the electronic environment 20 of FIG. 1. FIG. 3 is a block diagram of the authentication server 24 of the electronic environment 20 of FIG. 1.

With reference to FIG. 2, the user device 22 includes a communications interface 60, a user interface 62, memory 64, and processing circuitry 66. Other hardware may be included as well.

The communications interface 60 is constructed and arranged to connect the user device 22 to the communications medium 28 (also see FIG. 1) to enable communications with other equipment of the electronic environment 20 (e.g., the authentication server 24). Such communications may be IP-based, SAN-based, cellular-based, cable-based, fiber-optic based, wireless, cloud-based, combinations thereof, and so on. Accordingly, the communications interface 60 enables the user device 22 to robustly and reliably communicate with other external apparatus.

The user interface 62 is constructed and arranged to receive input from a user 30 and to provide output to the user 30 to enable the user 30 to perform useful work. In the context of a workstation, desktop computer, laptop, or the like, the user interface 62 may take the form of a keyboard, mouse/trackpad, electronic monitor, etc. In the context of a smartphone or a tablet, the user interface 72 may be formed by other components such as a miniature keyboard and display, a touch screen, and so on.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72, specialized authentication application(s) and data 74, and other applications and data 76. The operating system 72 is intended to refer to control instructions such as a kernel to manage computerized resources (e.g., processor cycles, memory space, etc.), drivers (e.g., an I/O stack), administrative tools and utilities, and so on. The specialized authentication application(s) and data 74 refers to code to provide and verify messages 52, 54 having message fields arranged in particular message field orders for authentication. The other applications and data 76 include applications and routines to access one or more protected resources 40, navigation applications, other user-level applications, and so on.

The processing circuitry 66 is constructed and arranged to operate in accordance with the various software constructs 70 stored in the memory 64. Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the user device 22. In particular, the computer program product 80 has a non-transitory (or non-volatile) computer readable medium which stores a set of instructions which controls one or more operations of the processing circuitry 66. Examples of suitable computer readable storage media include tangible articles of manufacture and apparatus which store instructions in a non-volatile manner such as CD-ROM, flash memory, disk memory, tape memory, and the like.

During operation, the processing circuitry 66 executes code of the various software constructs 70 to perform useful work. Along these lines, the processing circuitry 66 executes code of the specialized authentication application(s) and data 74 to form an authentication client circuit that filters outgoing messages 52 (also see FIG. 1). To this end, suppose that the authentication client circuit encounters an outgoing authentication request message, The authentication client circuit first compares the destination address of the outgoing authentication request message to a preconfigured address for the authentication server 24. If the destination address of the outgoing authentication request message does not match the preconfigured address for the authentication server 24, the authentication client circuit blocks the outgoing authentication request message from leaving the user device 22. However, if the destination address of the outgoing authentication request message matches the preconfigured address for the authentication server 24, the authentication client circuit customizes (e.g., modifies) the order of HTTP header fields in the header section of the authentication request message before transmitting the authentication request message to the authentication server 24. Such operation avoids inadvertently divulging sensitive information to a phishing site.

The particular order of the HTTP header fields purposefully matches an expected order of HTTP header fields at the authentication server 24. One will appreciate that the HTTP standard allows the HTTP header fields to be arranged in any order and remain compliant with the HTTP standard. Accordingly, the particular order of HTTP header fields among numerous possible alternative orders provides a rich and robust mechanism of signaling authenticity of the user device 22 to the authentication server 24. In particular, the authentication client circuit of the user device 22 and the authentication server 24 can be configured with algorithms that identify the same field order synchronized to time, to a user identifier, to both, etc. Then, if the particular message field order matches the expected message field order at the authentication server 24, there is lower risk that the user device 22 that sent the message is fraudulent. However, if the particular message field order does not match the expected message field order, there is higher risk that the source of the message is fraudulent. Further details will now be provided with reference to FIG. 3.

FIG. 3 is a block diagram of the authentication server 24 of the electronic environment 20 of FIG. 1. The authentication server 24 includes a communications interface 100, memory 102, and processing circuitry 104.

The communications interface 100 of the authentication server 24 is constructed and arranged to connect the authentication server 24 to the communications medium 28 (also see FIG. 1) to enable communications with other devices of the electronic environment 20 (e.g., the user devices 22). Such communications may be IP-based, SAN-based, cellular-based, cable-based, fiber-optic based, wireless, cloud-based, combinations thereof, and so on. Accordingly, the communications interface 100 enables the authentication server 24 to robustly and reliably communicate with other external apparatus.

The memory 102 of the authentication server 24 is intended to represent both volatile storage (e.g., DRAM, SRAM, etc.) and non-volatile storage (e.g., flash memory, magnetic memory, etc.). The memory 102 stores a variety of software constructs 110 including an operating system 112, specialized authentication application(s) and data 114, and other applications and data 116. The operating system 112 is intended to refer to control instructions such as a kernel to manage computerized resources (e.g., processor cycles, memory space, etc.), drivers (e.g., an I/O stack), administrative tools and utilities, and so on. The specialized authentication application(s) and data 114 refers to code to provide and verify messages 52, 54 having message fields arranged in particular message field orders for authentication. The other applications and data 116 include other applications such as code and data for user enrollment, code to form an adaptive authentication engine or a risk engine, code for other types of authentication such as those which use OTPs, biometrics, and so on. In terms of enrollment, in some arrangements, the user devices 22 are pre-configured in a manner which is similar to installing or deploying standard token-based software/secrets and the memory 64 of the authentication server 24 is updated to coordinate with the user devices 22, i.e., agent code and credentials are installed on each user device 22 (e.g., each user device 22 is pre-loaded with instructions and a unique file that holds various secrets, algorithms, identifiers, and so on).

The processing circuitry 104 of the authentication server 24 is constructed and arranged to operate in accordance with the various software constructs 110 stored in the memory 102. Such processing circuitry 104 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 120 is capable of delivering all or portions of the software constructs 110 to the authentication server 24. In particular, the computer program product 120 has a non-transitory (or non-volatile) computer readable medium which stores a set of instructions which controls one or more operations of the processing circuitry 104. Examples of suitable computer readable storage media include tangible articles of manufacture and apparatus which store instructions in a non-volatile manner such as CD-ROM, flash memory, disk memory, tape memory, and the like.

During operation, the processing circuitry 106 executes code of the various software constructs 110 to perform useful work. Along these lines, the processing circuitry 104 executes code of the specialized authentication application(s) and data 114 to form an authentication server circuit that customizes (e.g., modifies) the order of HTTP header fields in the header section of outgoing messages 54 intended for the user devices 22 before transmitting the outgoing messages 54 to the user devices 22.

The particular order of the HTTP header fields purposefully matches an expected order of HTTP header fields at the user devices 22. The particular order of HTTP header fields among numerous possible alternative orders provides an effective mechanism of individually signaling authenticity of the authentication server 24 to the user devices 22. In particular, the authentication server circuit and each user device 22 can be configured with algorithms that identify the same field order synchronized to time, to a user identifier, to both, etc. Accordingly, if the particular message field order matches the expected message field order at a particular user device 22, there is lower risk that the source of the message from the authentication server 24 is fraudulent. However, if the particular message field order does not match the expected message field order, there is higher risk that the source of the message from the authentication server 24 is fraudulent. Further details will now be provided with reference to FIG. 4.

Figure 4:
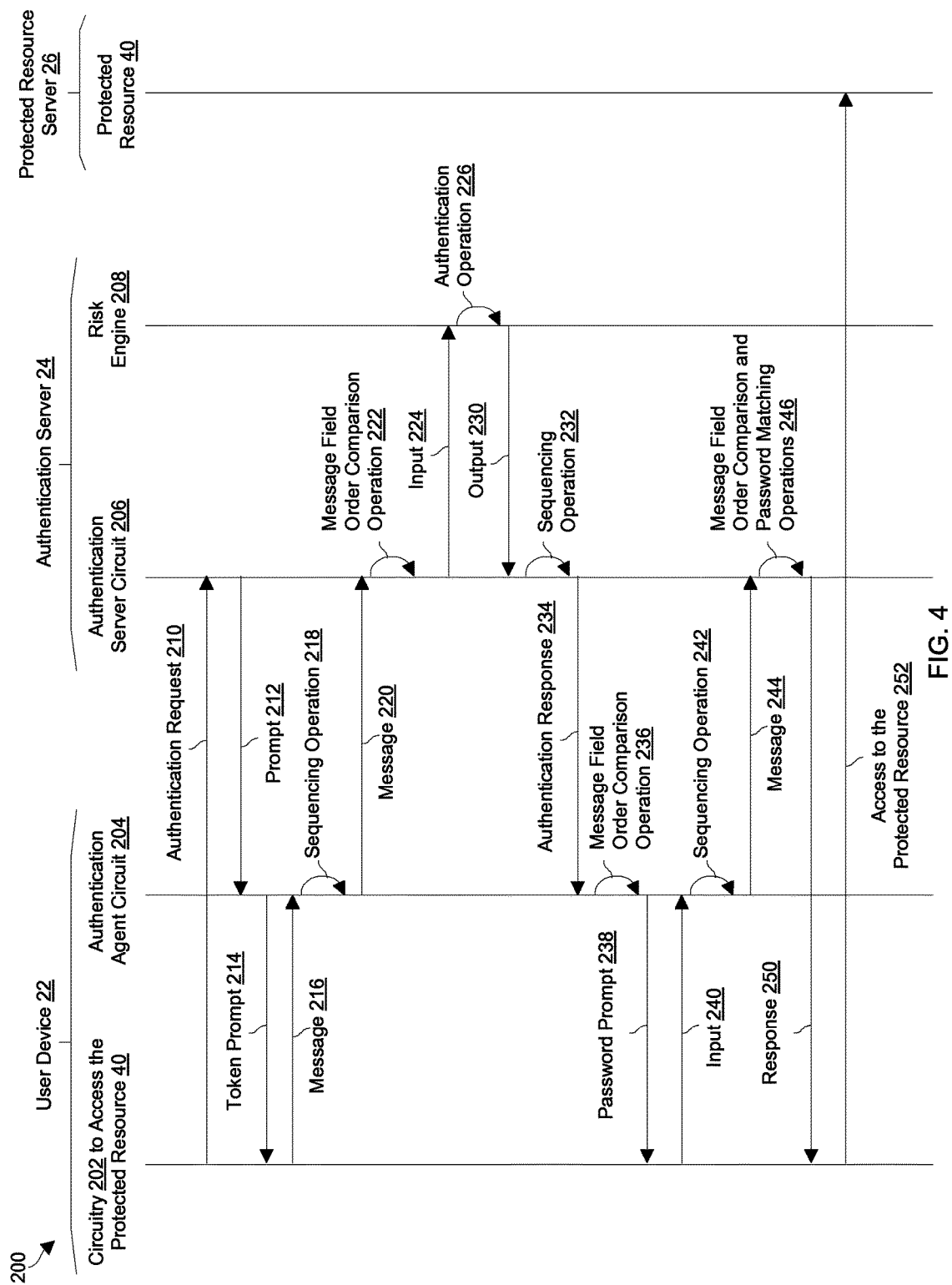
FIG. 4 is a sequence diagram detailing example activities which occur within the electronic environment of FIG. 1.

FIG. 4 is a sequence diagram 200 illustrating certain example details of the operation of the electronic environment 20 of FIG. 1. By way of example, the following components are involved: circuitry 202 of a user device 22 to access a protected resource 40, an authentication agent circuit 204 of the user device 22, an authentication server circuit 206 of the authentication server 24, a risk engine 208 of the authentication server 24, and the protected resource server 26. By way of example only, the result of a comparison between the current order of message fields and the expected order of message fields is input to the risk engine 208 as part of risk-based (or adaptive) authentication. Other use cases that do not involve risk-based authentication are suitable for use as well.

In this example, suppose that a user 30 wishes to access a protected resource 40 on the protected resource server 26 (also see FIG. 1). Along these lines, the user 30 may wish to login to an online bank account, read a file from an enterprise's file system, complete an online purchase, and so on. In such situations, the user 30 operates the circuitry 202 of the user device 22 (e.g., a processor running a user-level application) which initiates a communication 210 with the authentication server circuit 206 of the authentication server 24 to request authentication (see the arrow 210 in FIG. 1). In some situations, such communication 210 is sent directly from the user device 22 to the authentication server 24 as illustrated in FIG. 4. However, in other situations, the communication 210 is indirect through the protected resource server 26.

In response to the authentication request communication 210 from the circuitry 204, the authentication server circuit 206 provides a response 212 to prompt the user 30 for authentication credentials. This response 212 is intercepted by the authentication agent circuit 204 of the user device 22. Again, the response 212 may be sent directly from the authentication server 24 to the user device 22, or indirectly through the protected resource server 26. It should be understood that the authentication agent circuit 204 is able to intercept the response based on a set of identifiers in the response 212 (e.g., contents of one or more header fields, data in the body of the response 212, an evaluation of address data such as port number, combinations thereof, etc.). Moreover, such a response 212 may operate as a command or alert which puts the authentication agent circuit 204 in a mode to expect further messages which may require message field ordering and/or message field order verification.

With the authentication agent circuit 204 having intercepted the response 212, the authentication agent circuit 204 provides a prompt 214 to the user. The prompt 214 requests that the user 30 provide a token (e.g., an alphanumeric string) and/or other suitable authentication factor for use in authentication (e.g., a biometric, a user identifier, combinations thereof, etc.). A suitable token is a one-time passcode that is generated by a hardware token (physically possessed by the user 30) or a soft token running on the user device 22. In some soft token arrangements, the token is entered automatically thus alleviating the manual burden of reading and typing in the token from the user 30.

The user 30 then directs the user device 22 to provide the token in the form of a message 216 to the authentication server 24 (e.g., the user 30 hits an "enter" or "go" button which operates as a message command to the authentication agent circuit 204). In turn, the authentication agent circuit 204 intercepts the message 216 and blocks the message 216 if the message 216 does not identify the correct destination address for the authentication server 24 in order to prevent transmission of sensitive information to a rogue external device. However, if the destination address is correct (e.g., if the destination address matches a preconfigured destination address enforced by the authentication agent circuit 204), the authentication agent circuit 204 performs a sequencing operation 218 to generate a current sequence of header fields from a multitude of possible sequences of header fields based on a user identifier which uniquely identifies the user 30. That is, the authentication server circuit 206 responds to the message command by customizing the order of the header fields to form a modified message 220 which is then sent to the authentication server circuit 206 (also see the message 52 in FIG. 1). The user identifier can be conveyed to the authentication server 24 within the modified message 220 or earlier (e.g., in the communication 210).

Upon receipt of the message 220 from the authentication client circuit 204, the authentication server circuit 206 performs a message field order comparison operation 222 which generates an expected order for the header fields based on the user identifier, and compares the particular order of the header fields of the message 220 with the expected order for the header fields. Furthermore, the authentication server circuit 206 verifies that the current token matches an expected token. It should understood that detected matches indicate lower risk that the user 30 is fraudulent, and non-matches indicate higher risk that the user 30 is fraudulent.

The authentication server circuit 206 provides these results (and perhaps other data) as input 224 to the risk engine 208. Based on the input 224, the risk engine 208 performs a risk-based authentication operation 226 to authenticate the user 30. In particular, the risk engine 208 considers a variety of risk factors (e.g., whether the field orders matched, whether the tokens matched, biometrics, time of day, other collected authentication factors, etc.) and generates a risk score (i.e., a numerical measure of risk that the user 30 is fraudulent). The risk engine 208 then compares the risk score to a risk threshold to decide whether authentication is successful (e.g., a risk score that is lower than the risk threshold indicates successful authentication and a risk score that is higher than the risk threshold indicates that authentication is unsuccessful). Ultimately, the risk engine 208 provides, to the authentication server circuit 206, an output 230 indicating whether authentication was deemed successful or unsuccessful.

At this point, the authentication server circuit 206 is ready to send a response to the user device 22. Before sending the response, the authentication server circuit 206 performs sequencing operation 232 to generate a current sequence of header fields for the response from a multitude of possible sequences of header fields based on the user identifier. The authentication server circuit 206 then sends a response message 234 having that sequence of header fields to the user device 22 (also see the message 54 in FIG. 1).

Upon receipt of the response message 234 from the authentication server circuit 206, the authentication client circuit 204 performs a message field order comparison operation 236 which generates an expected order for the header fields based on the user identifier, and compares the particular order of the header fields of the response message 234 with the expected order for the header fields. A match indicates lower risk that the authentication server 24 is fraudulent, and a non-match indicates higher risk that the authentication server 24 is fraudulent.

At this point, it should be appreciated that authentication has been performed at least once in each direction. Along these lines, the authentication server circuit 206 compared the particular message field order from the user device 22 to an expected message field order (see arrow 222 in FIG. 4). Similarly, the authentication client circuit 204 compared the particular message field order from the authentication server 24 to an expected message field order (see arrow 236 in FIG. 4). If there is not a match at any point, remedial actions can be performed (e.g., denial of access or service, providing alerts, etc.).

Next, in this example, the authentication client circuit 204 provides a prompt 238 for a password to the user 30 (e.g., an alphanumeric string, a personal identification number or PIN, a passphrase, a set of swiping gestures, combinations thereof, etc.). The user device 22 may collect other authentication factors as well (e.g., cookies, biometrics, device characteristics, etc.).

After the user 30 provides input 240 which includes the password in response to the prompt 238, the input 240 is intercepted by the authentication agent circuit 204. Here, the authentication agent circuit 204 performs another sequencing operation 242 to generate a new sequence of header fields from a multitude of possible sequences of header fields based on a user identifier which uniquely identifies the user 30 (also see the previous sequencing operation 218 in FIG. 4). The authentication agent circuit 204 then sends a message 244 with the password input 240 to the authentication server 24 containing the new sequence of header fields for authentication.

Upon receipt of the message 244 from the authentication client circuit 204, the authentication server circuit 206 performs a set of authentication operations on the message 244. In particular, the authentication server circuit 206 performs a message field order comparison operation 246 which generates another expected order for the header fields based on the user identifier, and compares the particular order of the header fields of the message 244 with the expected order for the header fields. Additionally, the authentication server circuit 206 verifies that the password input 240 matches expected password input. Again, detected matches indicate lower risk that the user 30 is fraudulent, and non-matches indicate higher risk that the user 30 is fraudulent.

The authentication server circuit 206 then provides a response 250 to the user device 22. In particular, if the authentication server circuit 206 indicates that authentication is successful, the response 250 grants access to the protected resource 40. However, if authentication server circuit 206 indicates that authentication is unsuccessful, the response 250 denies access to the protected resource 40. In some arrangements, the response 250 includes a customized order of header fields to authenticate the authentication server 24 to the user device 22.

Upon receipt of a response 250 that grants access to the protected resource 40, the circuitry 202 is able to access the protected resource 40 (see arrow 252). It should be understood that authentication based on header field order may continue for subsequent messages in both directions during access of the protected resource 40 thus providing continuous authentication. Along these lines, such message field ordering and verification can be performed by other devices of the electronic environment 20 as well such as the protected resource servers 26. Further details will now be provided with reference to FIGS. 5 and 6.

Figure 5:
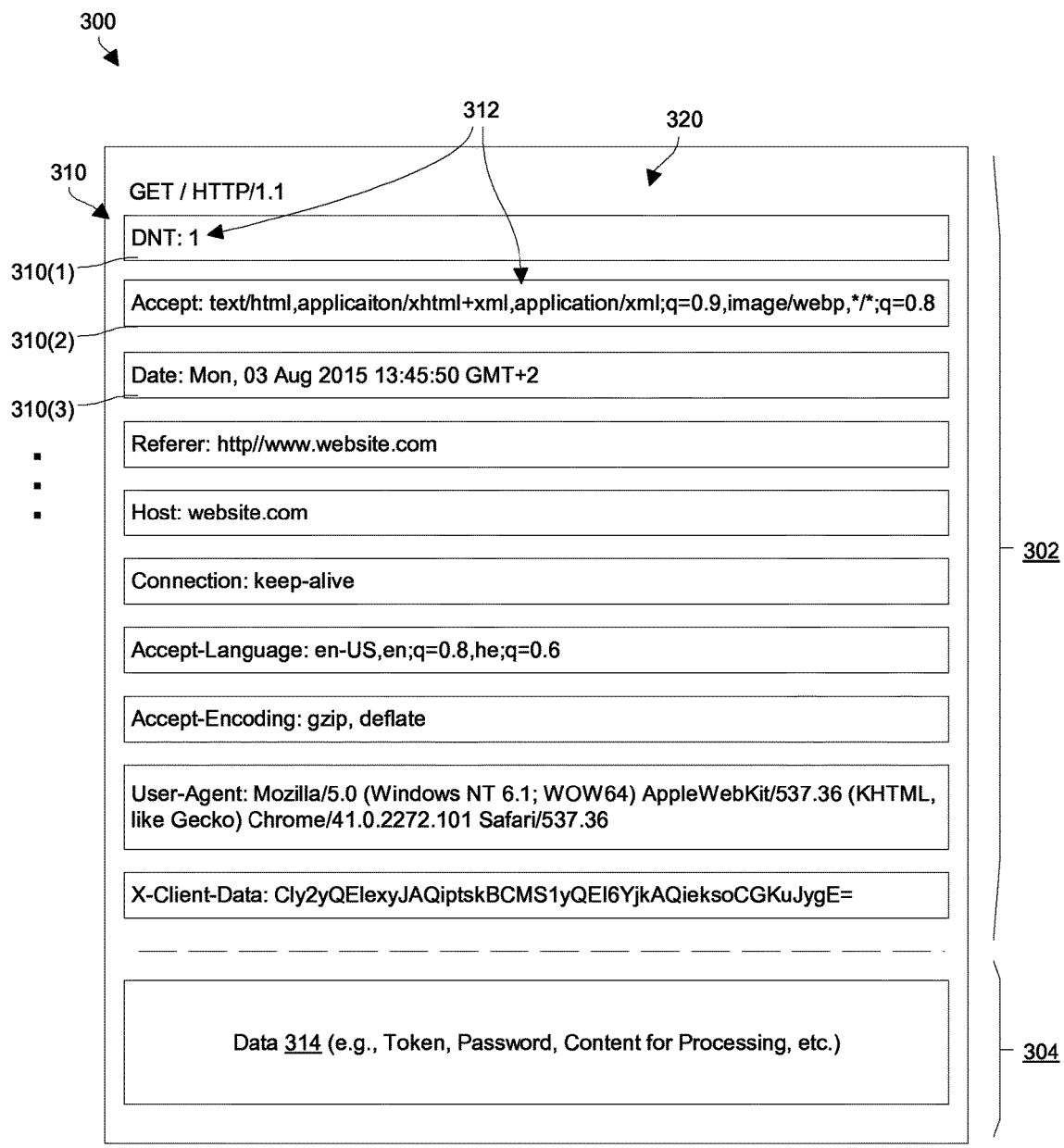
FIG. 5 is a block diagram of a first message having message fields arranged in a first message field order.
Figure 6:
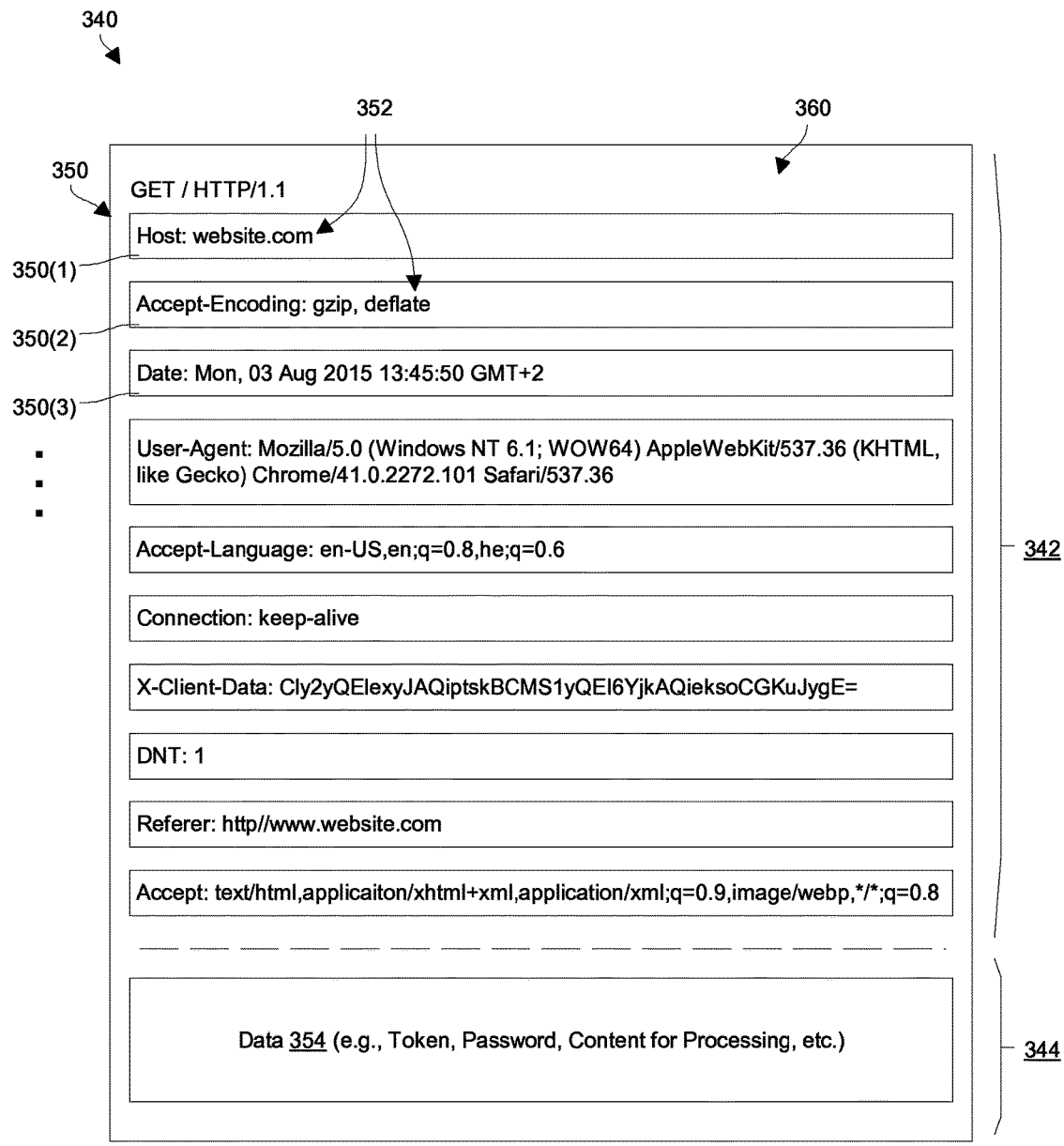
FIG. 6 is a block diagram of a second message having message fields arranged in a second message field order that is different than the first message field order.

FIGS. 5 and 6 show example messages having different message field orders which can be evaluated during a message exchange between devices for the purposes of authentication. In particular, when the particular message field order of a message from a sending device matches an expected message field order at a receiving device, the risk is low that the sending device is fraudulent. However, when the particular message field order of a message from the sending device does not match the expected message field order at the receiving device, the risk is high that the sending device is fraudulent.

As shown in FIG. 5, a message 300 includes a header section 302 and a body section 304. The header section 302 includes message fields 310(1), 310(2), 310(3), . . . (collectively, message fields 310) containing operating parameters 312. The operating parameters define/control how the message 300 is to be processed by a receiving device. The body section 304 contains data 314 (e.g., a payload) which is available for processing by the receiving device. Such body data 314 may include a username, a user identifier, a token, other user credentials (e.g., biometrics, device parameters, etc.), user-level data (e.g., text, images, audio/video data, file data, etc.), and so on.

It should be understood that a legitimate sending device purposefully arranges the message fields 310 in a particular order (or sequence) 320 as part of the process of authenticating to the receiving device. That is, the legitimate sending device and the receiving device are preconfigured to provide and receive the message fields 310 in the same order 320 and thus detect involvement of a fraudulent device.

By way of example, the message 300 is an HTTP message which forms part of an HTTP transaction. Accordingly, the message fields 310 are HTTP header fields, and the contents of each header field define operating parameters which are used by the receiving device to process the HTTP message. One should appreciate that there are currently over 80 possible headers for HTTP, and that custom headers are also acceptable (and if a custom header is unknown, it may be ignored by most server implementations).

In the particular example of FIG. 5, the message field 310(1) is a "DNT" header field and the contents indicate that "do not track is enabled", the message field 310(2) is an "Accept" HTTP header field and the contents indicate content-types that are acceptable for the response, the message field 310(3) is a "Date" HTTP header field and the contents identify the date and time that the message was sent, and so on. Clearly, the contents of these fields define operating aspects of the HTTP transaction.

It should be understood that, in accordance with the HTTP protocol, there is no requirement that the message fields 310 be in a particular order. Accordingly, the order of the message fields 310 is used for the purpose of authentication the sending device to the receiving device.

Along these lines, suppose that a particular user 30 having a unique user ID operates his or her user device 22. In this situation, the particular user 30 preconfigures the user device 22 so that HTTP messages to the authentication server 24 have a particular message field order, e.g., based on the user ID, current time, etc. Likewise, the authentication server 24 is preconfigured to expect HTTP messages having the particular message field order from the legitimate user device 22 of the particular user 30, e.g., based on the user ID, current time, etc. As a result, if the message field orders match, there is a strong likelihood that the message is authentic.

As shown in FIG. 6, another message 340 includes a header section 342 and a body section 344. The header section 342 includes message fields 350(1), 350(2), 350(3), . . . (collectively, message fields 350) containing operating parameters 352. The operating parameters define/control how the message 340 is to be processed by a receiving device. The body section 344 contains data 354 (e.g., a payload) which is available for processing by the receiving device.

In the example of FIG. 6, the message field 350(1) is a "Host" header field, the message field 350(2) is an "Accept-Encoding" HTTP header field, the message field 350(3) is a "Date" HTTP header field, and so on. The contents of each header field define operating parameters which are used by the receiving device to process the HTTP message.

It should be understood that a side-by-side comparison of the messages 300 and 340 shows that they contain the same operating parameters but that their header fields 310, 350 are in different orders 320, 360. Accordingly, if the authentication server 34 expects to receive a message from a particular user having the message order 320 in FIG. 5, the authentication server 34 will consider the message 300 to be of low risk from an authentication perspective (i.e., likely authentic) because the current order 320 of the message 300 and expected order match. However, if the authentication server 34 expects to receive a message from a particular user having the message order 320 in FIG. 5, the authentication server 34 will consider the message 340 of FIG. 6 to be of high risk from an authentication perspective (i.e., likely fraudulent) because the current order 360 of the message 340 and expected order does not match. Further details will now be provided with reference to FIG. 7.

Figure 7:
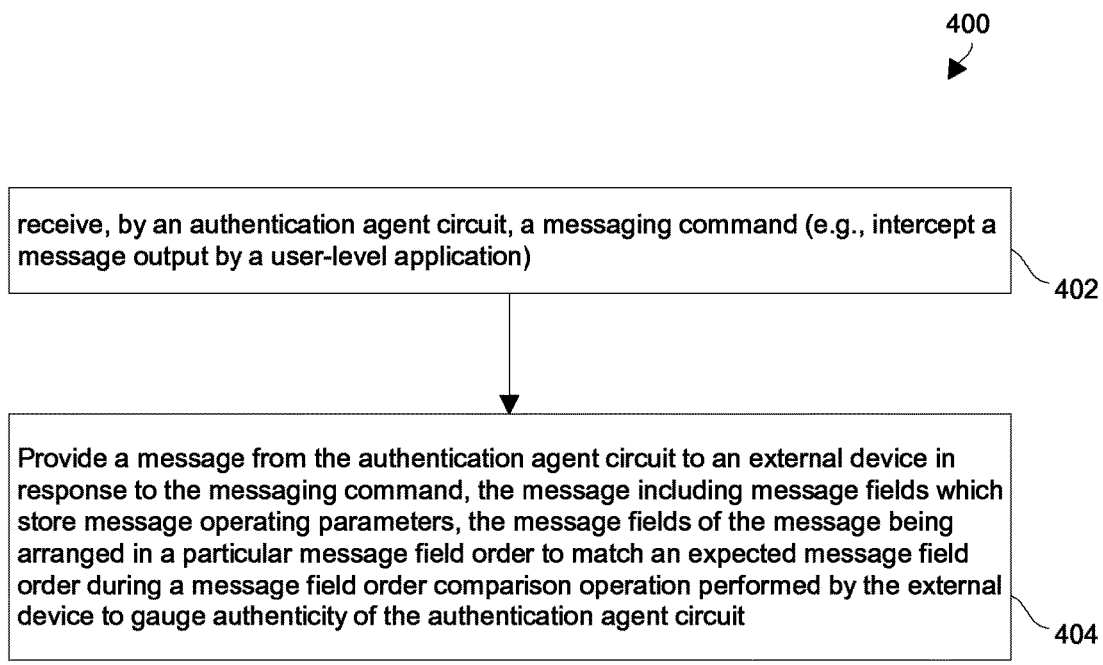
FIG. 7 is a flowchart of a procedure which is performed by an authentication agent circuit which is involved in authentication with an external device.

FIG. 7 is a flowchart of a procedure 400 which is performed by an authentication agent circuit (or other circuitry) of an electronic apparatus. Suitable electronic apparatus include the user devices 22, the authentication server 24, the protected resource servers 26, etc.

At 400, the authentication agent circuit receives a message command. For example, a user-level application which attempts to access a protected resource may output a message which is intercepted by the authentication agent circuit. Here, the message from the user-level application essentially operates as a message command to the authentication agent circuit which directs the authentication agent circuit to customize the order of the message header fields.

At 402, the authentication agent circuit provides a message to the external device in response to the messaging command. The message including message fields which store message operating parameters (e.g., see FIGS. 5 and 6). The message fields of the message are arranged in a particular message field order to match an expected message field order during a message field order comparison operation performed by the external device to gauge authenticity of the authentication agent circuit.

As described above, improved techniques are directed to authenticating with an external device by providing a message having message fields arranged in a particular message field order, e.g., Hypertext Transfer Protocol (HTTP) header fields containing HTTP operating parameters. If the particular message field order matches an expected message field order, there is lower risk that the source of the message is fraudulent (i.e., the source of the message properly ordered the message fields). However, if the particular message field order does not match the expected message field order, there is higher risk that the source of the message is fraudulent (i.e., the source of the message did not properly order the message fields). Such ordering of message fields can occur automatically and transparently (e.g., by an agent of the source device) thus providing a simpler authentication mechanism vis-à-vis manually reading and entering OTPs or other credentials. Additionally, authentication based on message field order can be imposed bi-directionally to protect against involvement of an unauthorized device (e.g., cloning, phishing, etc.). Furthermore, such techniques can be combined with other types of authentication such as risk-based authentication (based on a numerical measure of risk), adaptive authentication (based on a comparison of current behavior to previous behavior), biometric authentication, multi-factor authentication, authentication using OTPs, and so on.

One should appreciate that the above-described techniques do not merely provide a general password or token for use in authentication. Rather, the disclosed techniques involve providing a particular order for fields that contain data in accordance with a standard protocol. That is, in addition to utilizing that data within the field for processing in accordance with a protocol, the order of the fields is further used for authentication. Thus, with the disclosed techniques, the fields server multiple purposes i.e., contain data for processing and define field orders to provide an indication of low or high risk of fraud, among other things.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the authentication server 24 and/or the protected resource servers 26 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, in some arrangements, a protocol other than HTTP is used and the field of that other protocol are rearranged for the purposes of authentication. Example protocols include various network protocols, data storage protocols, file system protocols, and so on.

Furthermore, the sequence diagram of FIG. 4 was provided by way of example only. Other scenarios, situations, and exchanges are suitable for use as well. For example, a user 30 may attempt to access an adaptive authentication enabled VPN portal from a desktop or mobile device 22. Once the authentication agent circuit 204 detects the user attempt to access the portal, the authentication agent circuit 204 intercepts the login response to make sure this is not a phishing attempt. The authentication agent circuit 204 then prompts the user 30 to provide only a username. After providing the username, the authentication agent circuit 204 intercepts the HTTP request and changes the header order according to the generated token.

Subsequently, the authentication server circuit 206 receives the username and the header order and verifies the header order matches the expected header order of the provided username. After verifying the username exist in a database, and verifying that the header order matches the expected header order associated with the username, the authentication server circuit 206 submits the user device's fingerprint, along with other device data to an adaptive authentication engine for analysis. The adaptive authentication engine calculates a risk score and returns it to the authentication server circuit 206.

If the result of adaptive authentication indicates successful authentication (i.e., the risk score is low), the authentication server circuit 206 sends an acknowledgement response with a header order, matching the expected header order on the authentication agent circuit 204. Upon receiving the acknowledgement, the authentication agent circuit 204 verifies that the header order matches the expected header order and prompts the user to provide the password for the previously provided username. After receiving the password, the authentication server circuit 206 verifies the password matches the username, and that the header order matches the new token. If so, the authentication server circuit 206 grants the user 30 access.

It should be understood that, if at any time, the username, password, token, etc. are not correct, access is denied. Moreover, if a malicious person attempts a brute-force attack by offering multiple combinations/orders, the authentication server 24 can lock out the malicious person and thus safeguard the protected resource 40.

Furthermore, the authentication agent circuit 204 can be preconfigured with a particular URL for the authentication server 24. In this scenario, suppose that a fraudulent user sets up a phishing web server in an attempt to trick the authentication agent circuit 204 to provide a token, and later on pose as the legitimate user with the correct header order. Since the authentication agent circuit 204 awaits a preconfigured URL, the authentication agent circuit 204 will not intercept the HTTP request and thus not provide the required token code. In addition, since the authentication agent circuit 204 detected the preconfigured username but did not detect the preconfigured URL, it will intercept the traffic and alert the user 30 and/or the authentication server 24 of a phishing attempt.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. In a user device, a method of performing authentication with an external device, the method comprising:
   receiving, by electronic circuitry of the user device, a messaging command;
   providing, by the electronic circuitry, a message to the external device in response to the messaging command, the message including message fields which store message operating parameters, the message fields of the message being arranged in a particular message field order to match an expected message field order during a message field order comparison operation performed by the external device to gauge authenticity of the user device;
   wherein providing the message includes:
      forming a header section of the message, the header section including, as the message fields arranged in the particular message field order, a current sequence of header fields in compliance with a standard protocol;
   wherein the method further comprises:
      prior to providing the message, provisioning the electronic circuitry with a preconfigured Uniform Resource Locator (URL); and
   wherein providing the message further includes receiving, by the electronic circuitry, a destination URL which identifies a destination for the message, the electronic circuitry being constructed and arranged to (i) send the message to the external device when the destination URL matches the preconfigured URL and (ii) block release of the message to the external device when the destination URL does not match the preconfigured URL.

2. A method as in claim 1 wherein the message further includes a body section storing a user identifier to uniquely identify a particular user currently using the user device; and
   wherein forming the header section includes:
      performing a sequencing operation to generate the current sequence of header fields from a multitude of possible sequences of header fields based on the user identifier.

3. A method as in claim 1 wherein providing the message further includes:
      forming a body section of the message, the body section storing an authentication token which is derived by the user device on behalf of the user to corroborate authenticity.

4. A method as in claim 3 wherein the authentication token is a one-time passcode which is derived from a secret that is stored in the user device.

5. A method as in claim 1, further comprising:
forming a body section of the message, the body section holding transaction data to be processed by the external device upon successful authentication of the user device to the external device.

6. A method as in claim 1 wherein forming the header section of the message includes:
placing Hypertext Transfer Protocol (HTTP) operating parameters in the header fields of the current sequence of header fields, the HTTP operating parameters directing the external device to process the message as at least part of an HTTP transaction.

7. A method as in claim 1 wherein providing the message further includes:
replacing, in the header section of the message, an earlier sequence of header fields with the current sequence of header fields.

8. A method as in claim 1, further comprising:
receiving, from the external device, a response to the message, the response including response fields which store response operating parameters, the response fields of the response being arranged in a particular response field order, and
comparing the particular response field order to an expected response field order to determine authenticity of the external device.

9. A method as in claim 1, further comprising establishing, by the user device, the current sequence of header fields using a secret shared between the user device and the external device,
wherein the user device is authenticated by the external device as a result of a comparison operation performed by the external device which extracts an identification value from a received ordering of the current sequence of header fields and compares the identification value to the secret shared between the user device and the external device.

10. A method as in claim 1 wherein the method further comprises:
receiving from the external device, a response to the message, the response having a response body and response headers;
wherein the response to the message includes a header section, the header section of the response including a current sequence of response header fields in compliance with a standard protocol,
wherein the current sequence of response header fields is established by the external device using a second secret shared between the user device and the external device;
wherein the user device authenticates the external device as a result of a comparison operation performed by the user device; and
wherein the comparison operation performed by the user device includes:
extracting a response identification value from a received ordering of the current sequence of response header fields; and
comparing the response identification value to the second secret shared between the user device and the external device.

11. An electronic apparatus, comprising:
a communications interface;
memory; and
processing circuitry coupled to the communications interface and the memory, the memory storing instructions which, when carried out by the processing circuitry, cause the processing circuitry to:
receive a messaging command,
provide a message to the external device through the communications interface in response to the messaging command, the message including message fields which store message operating parameters, the message fields of the message being arranged in a particular message field order to match an expected message field order during a message field order comparison operation performed by the external device to gauge authenticity of the user device;
wherein the processing circuitry caused to provide the message is further caused to:
form a header section of the message, the header section including, as the message fields arranged in the particular message field order, a current sequence of header fields in compliance with a standard protocol;
wherein the message further includes a body section storing a user identifier to uniquely identify a particular user currently using the user device; and
wherein the processing circuitry caused to form the header section is further caused to:
perform a sequencing operation to generate the current sequence of header fields from a multitude of possible sequences of header fields based on the user identifier.

12. A computer program product having a non-transitory computer readable medium which stores a set of instructions to perform authentication with an external device, the set of instructions, when carried out by computerized circuitry, causing the computerized circuitry to perform a method of:
receiving a messaging command;
providing a message to the external device in response to the messaging command, the message including message fields which store message operating parameters, the message fields of the message being arranged in a particular message field order to match an expected message field order during a message field order comparison operation performed by the external device to gauge authenticity of the user device;
wherein providing the message includes:
forming a header section of the message, the header section including, as the message fields arranged in the particular message field order, a current sequence of header fields in compliance with a standard protocol;
wherein the method further comprises:
prior to providing the message, provisioning the electronic circuitry with a preconfigured Uniform Resource Locator (URL); and
wherein providing the message further includes receiving, by the electronic circuitry, a destination URL which identifies a destination for the message, the electronic circuitry being constructed and arranged to (i) send the message to the external device when the destination URL matches the preconfigured URL and (ii) block release of the message to the external device when the destination URL does not match the preconfigured URL.

13. In an authentication server, a method of performing authentication with an external device, the method comprising:
- receiving, by electronic circuitry of the authentication server, a message from an external device, the message including message fields which store message operating parameters, the message fields of the message being arranged in a particular message field order;
- performing, by the electronic circuitry, a message field order comparison operation to compare the particular message field order to an expected message field order to gauge authenticity of the external device; and
- processing, by the electronic circuitry, the message based on a result of the message field order comparison operation;
- wherein the message has a header section which includes, as the message fields arranged in the particular message field order, a current sequence of header fields in compliance with a standard protocol; and
- wherein performing the message field order comparison operation includes comparing the current sequence of header fields of the header section of the message to an expected sequence of header fields;
- wherein the message further includes a body section storing a user identifier to uniquely identify a particular user currently using the external device; and wherein the method further comprises:
- performing a sequencing operation to generate the expected sequence of header fields from a multitude of possible sequences of header fields based on the user identifier.

14. A method as in claim 13, further comprising:
- extracting a current authentication token from a body section of the message, and
- comparing the current authentication token to an expected authentication token to corroborate authenticity.

15. A method as in claim 13, wherein the message is a Hypertext Transfer Protocol (HTTP) message; wherein the current sequence of message fields is a series of HTTP header fields; and wherein processing the message further includes:
- reading contents of the series of HTTP header fields to process the message as at least part of an HTTP transaction.

16. A method as in claim 13, further comprising:
- providing, to the external device, a response to the message, the response including response fields which store response operating parameters, the response fields of the response being arranged in a particular response field order to match an expected response field order during a response field order comparison operation performed by the external device to gauge authenticity of the authentication server.

17. An electronic apparatus, comprising:
- a communications interface;
- memory; and
- processing circuitry coupled to the communications interface and the memory, the memory storing instructions which, when carried out by the processing circuitry, cause the processing circuitry to:
  - receive a message from an external device through the communications interface, the message including message fields which store message operating parameters, the message fields of the message being arranged in a particular message field order;
  - perform a message field order comparison operation to compare the particular message field order to an expected message field order to gauge authenticity of the external device; and
  - process the message based on a result of the message field order comparison operation;
- wherein the message has a header section which includes, as the message fields arranged in the particular message field order, a current sequence of header fields in compliance with a standard protocol; and
- wherein the processing circuitry caused to perform the message field order comparison operation is further caused to compare the current sequence of header fields of the header section of the message to an expected sequence of header fields;
- wherein the message further includes a body section storing a user identifier to uniquely identify a particular user currently using the external device; and
- wherein the processing circuitry is further caused to perform a sequencing operation to generate the expected sequence of header fields from a multitude of possible sequences of header fields based on the user identifier.

18. A computer program product having a non-transitory computer readable medium which stores a set of instructions to perform authentication with an external device, the set of instructions, when carried out by computerized circuitry, causing the computerized circuitry to perform a method of:
- receiving a message from an external device, the message including message fields which store message operating parameters, the message fields of the message being arranged in a particular message field order;
- performing a message field order comparison operation to compare the particular message field order to an expected message field order to gauge authenticity of the external device; and
- processing the message based on a result of the message field order comparison operation;
- wherein the message has a header section which includes, as the message fields arranged in the particular message field order, a current sequence of header fields in compliance with a standard protocol; and
- wherein performing the message field order comparison operation includes: comparing the current sequence of header fields of the header section of the message to an expected sequence of header fields;
- wherein the message further includes a body section storing a user identifier to uniquely identify a particular user currently using the external device; and wherein the method further comprises:
- performing a sequencing operation to generate the expected sequence of header fields from a multitude of possible sequences of header fields based on the user identifier.

* * * * *